Nov. 20, 1923.

C. W. THURAU 1,474,692

TIRE CHAIN COUPLING

Filed March 26, 1923

Inventor
C. W. Thurau

Witness
H. Woodard

By H. B. Wilson & Co.
Attorneys

Patented Nov. 20, 1923.

1,474,692

UNITED STATES PATENT OFFICE.

CHARLES W. THURAU, OF OIL CITY, PENNSYLVANIA.

TIRE-CHAIN COUPLING.

Application filed March 26, 1923. Serial No. 627,716.

*To all whom it may concern:*

Be it known that I, CHARLES W. THURAU, a citizen of the United States, residing at Oil City, in the county of Venango and State of Pennsylvania, have invented certain new and useful Improvements in Tire-Chain Couplings; and I do declare the following to be a full, clear, and exact description of the invention, such as will enable others skilled in the art to which it appertains to make and use the same.

My invention relates to improvements in coupling devices for chains and is designed primarily for use in connecting the ends of tire chains, the object being to provide a simple and inexpensive construction, yet one which will be highly desirable and cannot become accidentally released.

With the foregoing in view, the invention resides in the novel subject matter hereinafter described and claimed, the description being supplemented by the accompanying drawing.

Figure 2:
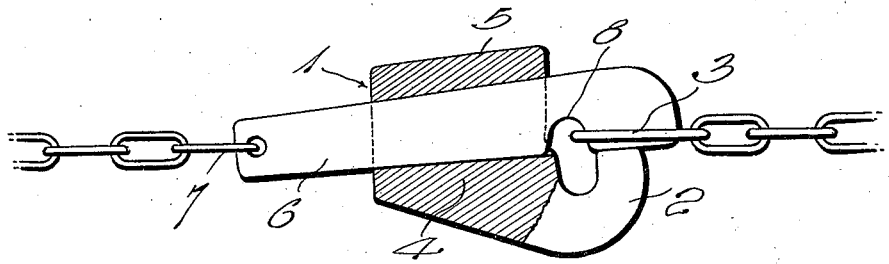
Figure 2 is a longitudinal sectional view showing one step in the act of coupling or uncoupling the ends of a chain.
Figure 3:
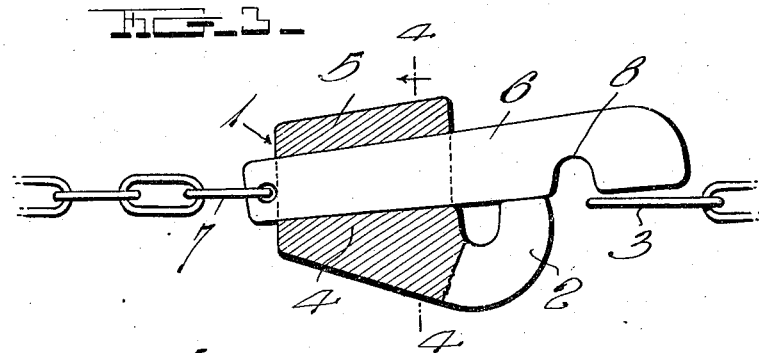
Figure 3 is a view similar to Fig. 2 but showing still another relation of parts.
Figure 4:
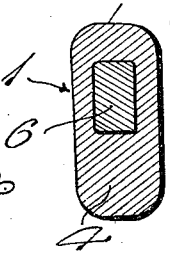
Figure 4 is a transverse sectional view on line 4—4 of Fig. 3.

In the drawings above briefly described, the numeral 1 designates a sleeve open at both ends and having a hook 2 at one end for engagement with the link 3 at one end of a tire chain or other chain. The sleeve 1 is preferably flat and its hook 2 is disposed adjacent one of its edge walls 4 and opens toward the opposite edge wall 5. In the form of construction shown, the walls 4 and 5 converge away from the hook as seen in Figs. 2 and 3.

Figure 1:
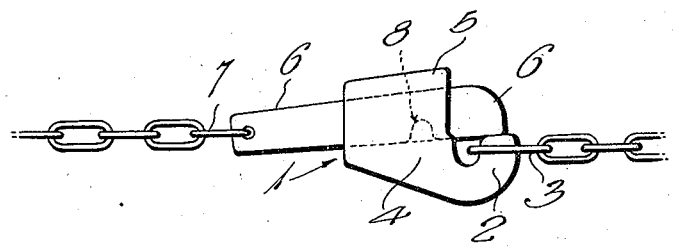
Figure 1 is a side elevation of a coupling constructed in accordance with my invention.

The flat bolt 6 passes slidably through the sleeve 1 between the edge walls 4 and 5 of the latter and is tapered for tight contact with said edge walls when said bolt is drawn inwardly to the maximum, as indicated in Fig. 1. This bolt is connected with the link 7 at the opposite end of the chain from the link 3 and consequently it will be seen that a continued pull will be exerted upon the bolt to hold it in such position as to extend across and close the hook 2, thereby preventing removal of the link 3 accidentally. The inner edge of the bolt 6 however is formed with a notch 8 into which the link 3 may be moved when said link is to be positioned in or removed from the hook 2, it being obvious that when said link is in the notch 8, and the bolt 6 is longitudinally moved in one direction or the other, or the sleeve 1 is moved with respect to said bolt, the coupling may be released or secured, as occasion may demand. As long as the link 3 is in the hook 2, it pulls in one direction upon the sleeve 1 and the link 7 pulls in the other direction on the bolt 6, thus insuring that the coupling shall remain tightly closed until it is forcibly released by hand.

As excellent results may be obtained from the details disclosed, they are preferably followed, but within the scope of the invention as claimed, numerous minor changes may be made.

I claim:

A chain coupling comprising an open ended sleeve having a longitudinal tapered bore and being provided at one end of said bore with an integral hook for engagement for one end of the chain, and a tapered slidable bolt passing through the bore of said sleeve and adapted to be connected at one end with the other end of said chain, the opposite end of said bolt normally closing said hook and being provided with a notch for receiving the adjacent end of the chain when moving it to and from said hook.

In testimony whereof I have hereunto affixed my signature.

CHARLES W. THURAU.